PAUL F. G. HOLST
*INVENTOR.*
BY [signature]
HIS ATTORNEY

PAUL F. G. HOLST
*INVENTOR.*

BY [signature]

HIS ATTORNEY 2,797,315

PORTABLE LOUD-SPEAKER TYPE RADIO RECEIVER WITH BATTERY-SAVING EARPHONE CIRCUIT

Paul F. G. Holst, Los Angeles, Calif., assignor to Hoffman Electronics Corporation, a corporation of California Application October 4, 1954, Serial No. 459,897

3 Claims. (Cl. 250—20)

This invention relates to improvements in radio receiving apparatus and more particularly to an ultra portable radio receiver which provides some unique features.

In the past, many portable radio receivers have been provided, but all of these have been subject to the defect that even when a single listener is utilizing the receiver outdoors, the volume level must be adjusted to a very high point in order to permit the listener to hear the reproduced information under these conditions in which most of the audio energy is dispersed and useless to the listener. As a result of so increasing the volume level, the reproduced information is generally distorted and full pleasure cannot be derived from the instrument. As has been indicated, because of the fact that portable receivers are most generally used outdoors, the acoustics do not provide any reverberation and, hence, a high audio level may be required and consequent distortion may result.

Therefore, it is an object of this invention to provide an improved portable radio receiver.

It is a further object of this invention to provide an improved battery-operated portable radio receiver which permits low-level, relatively distortion-free individual listening.

It is a still further object of this invention to provide an inexpensive circuit for a portable radio receiver which permits the alternate use of a loudspeaker for group listening or an earpiece reproducing unit for individual listening.

It is an additional object of this invention to provide a portable radio receiver which consumes a minimum of battery current for a given set of listening conditions.

According to the present invention, a portable radio receiver, battery-operated, is provided with which the user may selectively listen to the reproduced information on an integrated loudspeaker or upon a hearing aid type of earpiece which may be connected to the output circuits of the receiver. Upon such connection of the external earpiece, the loudspeaker is disconnected from the circuit thus eliminating needless duplication of audio reproduction and reducing distortion and unnecessary power drain which would result from operating both reproducers simultaneously. A simple low-cost switch is provided to effect the automatic disconnection of the loudspeaker when the earpiece is being utilized. That switch is also designed to connect battery saving resistors into the filament and anode circuits when the earpiece is being used.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

Figure 1:
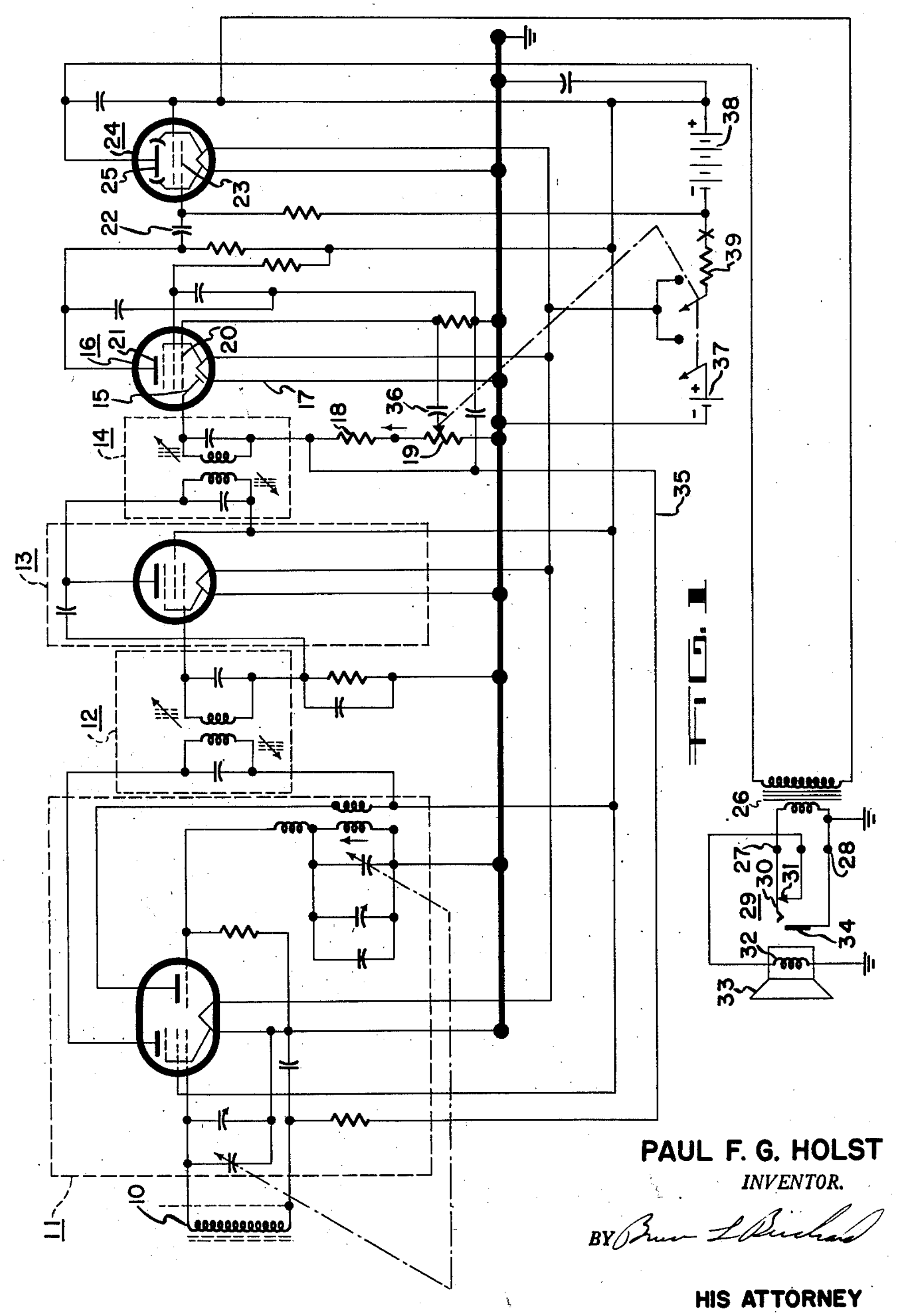
Figure 1 is a circuit diagram of a portable receiver according to the present invention.

In Figure 1 radio signals are intercepted by ferrite loop antenna 10 and are converted in oscillator and converter stage 11 to an intermediate frequency. This signal at intermediate frequency is coupled through I. F. transformer 12 to I.-F. amplifier stage 13 and, subsequently, through I.-F. transformer 14 to diode anode 15 in detector-amplifier tube 16. The I.-F. signal is detected between anode 15 and filament-cathode 17 of multi-purpose tube 16 and an audio signal plus an A. V. C. signal appear across resistors 18 and 19, the latter resistor being variable so as to constitute the volume control for the receiver. The detected audio signal is passed through coupling condenser 36 to grid 20 of the amplifier portion of multi-purpose tube 16. An amplified audio signal appears at anode 21 of vacuum tube 16 and is coupled through condenser 22 to grid 23 of output amplifier tube 24. Output audio signals are coupled from anode 25 of output tube 24 through matching transformer 26 to terminals 27 and 28 of automatic switch 29. Terminal 27 is coupled through normally closed contacts 30 and 31 to one terminal of the voice coil 32 on loudspeaker 33. Terminal 28 is connected to continuous contact 34. A and B voltages are provided by batteries 37 and 38, respectively.

The circuit of Figure 1 operates as follows. Radio signals are intercepted by antenna 10 which is of the ferrite loop type so as to require a minimum of space. The signals so intercepted are converted to an intermediate frequency of, for example, 465 kilocycles. These signals are amplified in stage 13 and the modulation signals appearing on the intermediate frequency signal are detected in the diode portion of the multi-purpose tube 16. An A. V. C. signal appears on connector 35 and is utilized to provide automatic volume control through application of this A. V. C. signal to the converter. The audio envelope of the I.-F. signal is also detected and appears across a combination of fixed resistor 18 and variable potentiometer 19. The audio signal from potentiometer 19 is coupled through condenser 36 to grid 20 of the amplifier portion of multi-purpose tube 16 and an amplified audio signal appears at anode 21 of that tube. This amplified audio signal is coupled through condenser 22 to grid 23 of the final audio amplifier or output tube 24. The amplified audio signal is coupled from anode 25 through an output transformer, which provides appropriate impedance matching, to voice coil 32 of speaker 33. The path for the audio signal includes contacts 30 and 31 on speaker switch 29. As will be more clear from the description of Figure 2, when the plug of an earpiece is inserted in automatic switch 29, contact 30 is raised and the circuit to voice coil 32 is broken. Contact 30 rests upon the tip portion of the earphone plug and portion 34 of switch 29 makes contact with the remaining barrel portion of the plug to complete the connection to the external earphone. Thus the speaker is de-energized and the remote earphone is energized.

Figures 2, 3:
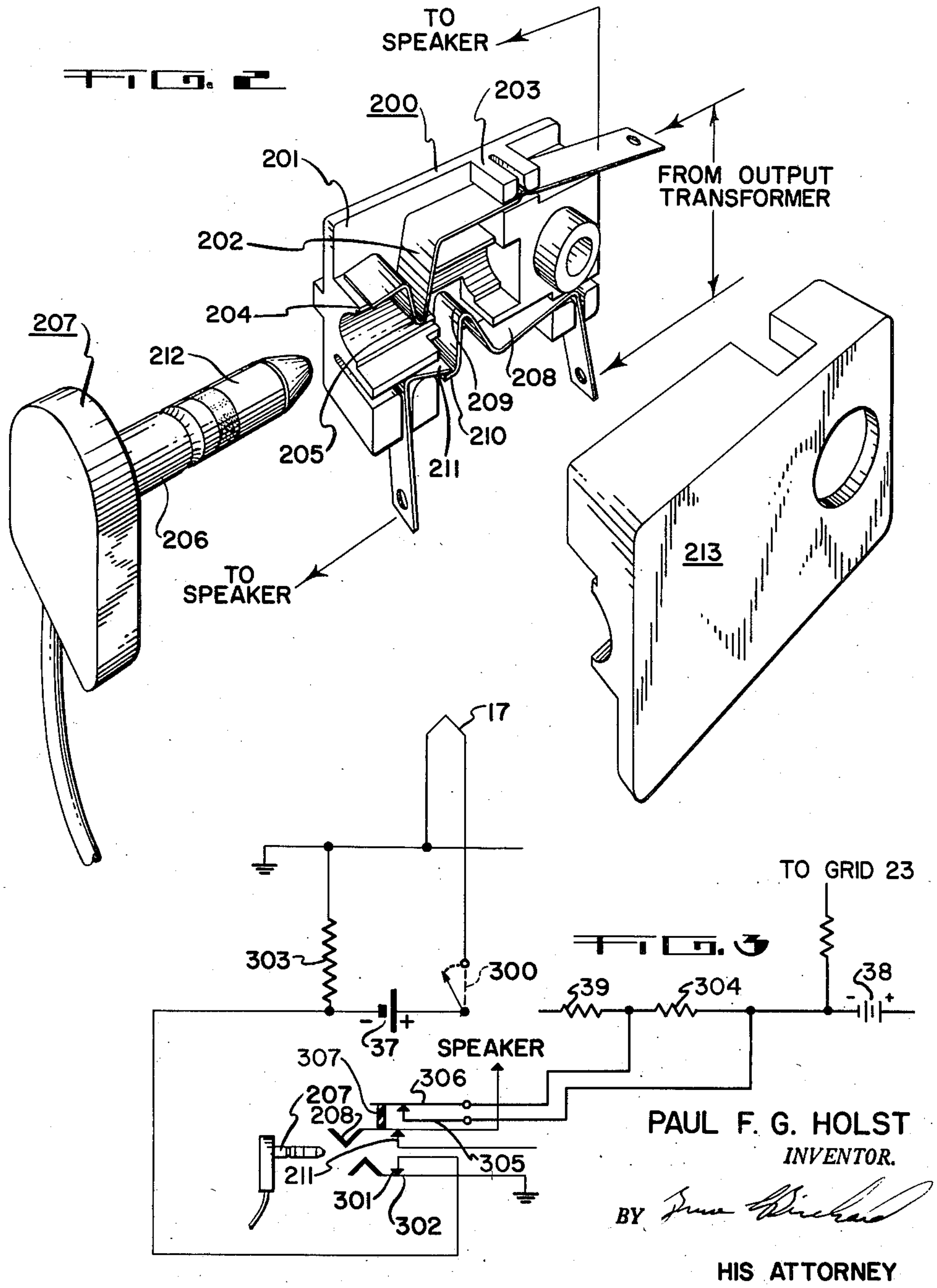
Figure 2 is a perspective view, partially exploded, showing the automatic speaker switch according to this invention.
Figure 3 is a schematic diagram of an alternative form of a portion of Figure 1.

In Figure 2, speaker switch 200 includes base portion 201 of an insulating material, such as plastic material. The base is formed with a number of slots and apertures so as to retain in operating position the conductive elements which form the switch. Continuous contact 202 is made of a material having high resilience and is retained in the appropriate position in base 201 by means of positioning elements 203 and shell element 204. The U-shaped portion 205 of contact member 202 provides a smooth but firm contact with barrel portion 206 of earphone or external earpiece plug 207 when that plug is in position for operation of the earphone. Contact element 208 is of resilient material and is formed with a plug-engaging portion 209 and a switch section 210, the latter being positioned for normal electrical and mechanical engagement with second switch contact element 211. Portion 209 of contact 208 is engaged by tip portion 212 of plug 207 and as a result of such engagement electrical contact is made with tip portion 212 and at the same time, as a result of the mechanical engagement, switch portion 210 of contact 208 is depressed breaking its electrical connection with second switch element 211. It should be noted that plug tip 212 is insulated in conventional fashion from barrel portion 206 so that upon engagement of the tip and barrel portion of plug 207 with contacts 208 and 202, respectively, any audio voltage supplied to the speaker switch from the audio output transformer 26 of Figure 1 will be conducted to the remote earphone. At the same time, the path for the audio which normally flows from the output transformer to the internal speaker 33 will be broken. The switch is completed by the addition of cover 213 which may be held in place by a rivet or the like.

In Figure 3, operating current for the filaments of a vacuum tube, for example, filament 17, is provided from battery 37 through switch 300 when that switch is in a closed position. In addition, during operation of the receiver with the internal speaker, the negative terminal of battery 37 is connected to ground potential through contact 301 and contact member 302. Under this condition resistor 303 is short-circuited, thus permitting a full current flow to the filaments of the receiver. Upon insertion of plug 207, however, contact element 302 is urged out of contact with remaining contact 301 and resistor 303 is no longer short-circuited. Thus the current flowing to the various filaments of the vacuum tubes in the receiver is reduced. It may be found desirable to insert the current limiting resistor in a single filament circuit, for example, in that of the output audio tube.

It is clear that the audio power required when the earphone is being used is materially less than that required when the internal speaker is being driven. The circuit just described takes advantage of that fact by reducing the filament current flowing to the output stage thus reducing the audio level which will be obtained out of that stage, but at the same time reducing the current drain on the "A" battery and prolonging the life of that battery. Battery life is, of course, a very important factor in portable radio receivers.

To lengthen the "B" battery life, two additional normally closed contacts 305 and 306 are added to switch 200 as is shown schematically in Figure 3. Contact 306 carries insulator 307 which rests upon contact 208. Insertion of plug 207 deflects contact 208 and, consequently, contact 306, thus breaking the circuit from contact 305 to contact 306. These contacts 305 and 306 normally short-circuit resistor 304 which is in series with resistor 39. Resistor 39 normally provides the bias to grid 23 of the output audio tube. Thus, the addition of the resistance of resistor 304 also increases the bias on the output tube by a predetermined amount, further reducing the current flowing from "B" battery 38 and prolonging its life. By reason of the selectable insertion of resistor 304, the filament current may also be limited to a large extent, by the selectable inclusion of resistor 303, without incurring temperature limiting levels at the filaments of the affected tubes which would, in the absence of resistor 304, produce appreciable distortion.

Thus it may be seen that there has been provided a portable radio receiver which permits the selective use of either an external earphone or the speaker internal to the radio receiver so that the greatest listening pleasure may be provided with a minimum of battery drain and a maximum in battery life.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. In an ultra-portable battery-operated superheterodyne radio receiver an output audio amplifier including a vacuum tube having a filament-cathode, an anode, and a control electrode, an internal loudspeaker, an automatic loudspeaker switch electrically interposed therebetween, said switch including first and second input terminals and first and second output terminals, a continuous conductor interconnecting said first input and first output terminals, a resilient second conductor including input and output sections, such sections being normally in electrical contact with each other to form a continuous electrical path between said second input and output terminals, said switch being adapted to receive the connector plug of an external earpiece reproducer, said input section of said second conductor having a plug-engaging portion thereon which, upon engagement by the connector plug of an external earpiece, moves said input section out of electrical contact with said output section and into electrical contact with said external earpiece, a source of operating current for said filament, a first circuit including said operating current source, a first current limiting resistor, a third conductor associated with said speaker switch and positioned to be actuated by the engagement of said connector plug with said speaker switch to insert said first current limiting resistor in said first circuit between said source of operating current and said filament, a source of positive voltage having a positive terminal adapted for coupling to said anode of said vacuum tube and a negative terminal, a second circuit including said vacuum tube and said positive voltage source, a second current limiting resistor, and a fourth conductor positioned to be actuated by the engagement of said connector plug with said speaker switch to insert said second current limiting resistor in said second circuit between said voltage source and said anode of said vacuum tube.

2. Apparatus according to claim 1 in which a third resistor has a first end terminal coupled to said negative terminal of said voltage source and a second end terminal coupled to said cathode of said vacuum tube, a fourth resistor coupled between said control electrode of said vacuum tube and said negative terminal of said voltage source, and said second current limiting resistor being selectively insertable in series with said third resistor upon actuation of said fourth conductor by the engagement of said connector plug with said speaker switch.

3. A battery-operated portable radio receiver including an antenna, an oscillator and converter stage coupled to said antenna, and an intermediate frequency amplifier coupled to said oscillator-converter, a second detector coupled to said intermediate frequency amplifier, an audio amplifier coupled to said second detector, an internal loudspeaker, an automatic speaker switch means interconnected between said audio amplifier and said speaker, first and second current limiting resistors, a source of filament operating current, a source of positive anode voltage, said switch means being adapted to receive the plug connector of an external earpiece reproducer and upon receiving such connector to de-energize said internal loudspeaker and energize said external earpiece reproducer simultaneously, and said first and second current limiting resistors being selectively insertable in series with said source of filament operating current and said source of positive voltage, respectively, upon said reception by said switch means of said plug connector.

References Cited in the file of this patent

UNITED STATES PATENTS

| | | |
|---|---|---|
| 1,666,522 | Andrews | Apr. 17, 1928 |
| 2,089,165 | Oliver | Aug. 3, 1937 |
| 2,319,527 | Zavattaro | May 18, 1943 |
| 2,641,704 | Stott | June 9, 1953 |

OTHER REFERENCES

"Vacation Portable" by H. G. McEntee, Radio-Craft Magazine, August 1938.